US007627900B1

(12) United States Patent
Noel et al.

(10) Patent No.: US 7,627,900 B1
(45) Date of Patent: Dec. 1, 2009

(54) ATTACK GRAPH AGGREGATION

(75) Inventors: Steven E. Noel, Woodbridge, VA (US); Sushil Jajodia, Oakton, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 817 days.

(21) Appl. No.: 11/371,930

(22) Filed: Mar. 10, 2006

Related U.S. Application Data

(60) Provisional application No. 60/659,890, filed on Mar. 10, 2005, provisional application No. 60/659,897, filed on Mar. 10, 2005, provisional application No. 60/659,896, filed on Mar. 10, 2005.

(51) Int. Cl.
*G06F 11/00* (2006.01)
*G06F 12/14* (2006.01)
*G06F 12/16* (2006.01)

(52) U.S. Cl. ............................ 726/25; 726/23; 726/27; 726/24; 709/224; 709/223

(58) Field of Classification Search .................. None
See application file for complete search history.

(56) References Cited

U.S. PATENT DOCUMENTS 7,162,649 B1 * 1/2007 Ide et al. ..................... 713/165
7,237,264 B1 * 6/2007 Graham et al. ................ 726/23
7,243,148 B2 * 7/2007 Keir et al. .................... 709/224
7,257,630 B2 * 8/2007 Cole et al. .................. 709/224
7,340,776 B2 * 3/2008 Zobel et al. ................... 726/24
7,392,545 B1 * 6/2008 Weber et al. ................. 726/25

OTHER PUBLICATIONS

Steven Noel, Sushil Jajodia, "Managing attack graph complexity through visual hierarchical aggregation," Oct. 2004, VizSec/DMSEC "04: Proceedings of the 2004 ACM Workshop on Visualization and data mining, pp. 109-118.*
Steven Noel, Sushil Jajoida, Brian O'Berry, Michael Jacobs, "Efficient Minimum-Cost Network Hardening via Exploit Dependency Graphs," Dec. 2003, Proceedings of the 19$^{th}$ Annual Computer Security Applications Conference.*
Peng NIng, Yun Cui, Douglas Reeves, Dingbang Xu, "Techniques and tools for analyzing intrustion alerts," May 2004, ACM: Transactions on information and System Security (TISSEC), vol. 7, issue 2, pp. 274-318.*

* cited by examiner

*Primary Examiner*—Nasser G Moazzami
*Assistant Examiner*—Fikremariam Yalew
(74) *Attorney, Agent, or Firm*—David G. Grossman

(57) ABSTRACT

Disclosed is framework for aggregating network attack graphs. A network may be represented as a dependency graph. Condition set(s), exploit set(s) and machine set(s) may be generated using information from the dependency graph. Exploit-condition set(s) may be generated using the condition set(s) and the exploit set(s). Machine-exploit set(s) may be generated using the exploit-condition set(s) and machine set(s).

20 Claims, 13 Drawing Sheets

ATTACK GRAPH AGGREGATION

CROSS-REFERENCES TO RELATED APPLICATIONS

This application claims the benefit of U.S. Provisional Application No. 60/659,890, to Noel et al., filed Mar. 10, 2005, and entitled "Attack Graph Aggregation;" U.S. Provisional Application No. 60/659,897, to Noel et al., filed Mar. 10, 2005, and entitled "Correlating Intrusion Events Using Attack Graph Distances;" and U.S. Provisional Application No. 60/659,896, to Jajodia et al., filed Mar. 10, 2005, and entitled "Network Attack Modeling, Analysis, and Response" which are all hereby incorporated in whole by reference.

STATEMENT REGARDING FEDERALLY FUNDED SPONSORED RESEARCH OR DEVELOPMENT

The U.S. Government has a paid-up license in this invention and the right in limited circumstances to require the patent owner to license others on reasonable terms as provided for by the terms of: Contract No. F30602-00-2-0512 awarded by the Air Force Research Laboratory, Rome; Grant No. DAAD19-03-1-0257 awarded by the Army Research Office; and Contract No. W911QX-04-C-0101 awarded by the Army Research Laboratory.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

DETAILED DESCRIPTION OF EMBODIMENTS

An embodiment is a framework for managing network attack graph complexity through interactive visualization, which includes hierarchical aggregation of graph elements. Aggregation may collapse non-overlapping subgraphs of an attack graph to single graph vertices, providing compression of attack graph complexity. The aggregation is recursive (nested), according to a predefined aggregation hierarchy. This hierarchy establishes rules at each level of aggregation, with the rules being based on either common attribute values of attack graph elements or attack graph connectedness. The higher levels of the aggregation hierarchy correspond to higher levels of abstraction, providing progressively summarized visual overviews of the attack graph. Rich visual representations that capture relationships among semantically-relevant attack graph abstractions are disclosed. While it would be possible to allow arbitrary nested aggregation of graph elements, it may be better to constrain aggregation according to the semantics of the network attack problem, i.e., according to an aggregation hierarchy. The aggregation hierarchy may also make efficient automatic aggregation possible. An abstraction of protection domain as a level of the aggregation hierarchy, which corresponds to a fully-connected subgraph (clique) of the attack graph is also disclosed. Expensive detection of attack graph cliques may be avoided through knowledge of a networks' configuration, i.e., predefined protection domains. Overall, computation in the framework should have worst-case quadratic complexity, but in practice complexity may be greatly reduced because users generally interact with (often negligible) subsets of the attack graph. The framework is applied to an example network, using a software system developed for generating and visualizing network attack graphs.

Attack graphs represent actual or possible attacks through a network. They can represent interactions among individual network vulnerabilities (via attacker exploits), leading to an understanding of collective impact on network security. Attack graphs can have application in a number of areas of network security, including vulnerability analysis, intrusion alarm correlation, and attack response. They may be applied in both an offensive (e.g., penetration testing) or defensive (e.g., network hardening) context.

Figure 1:
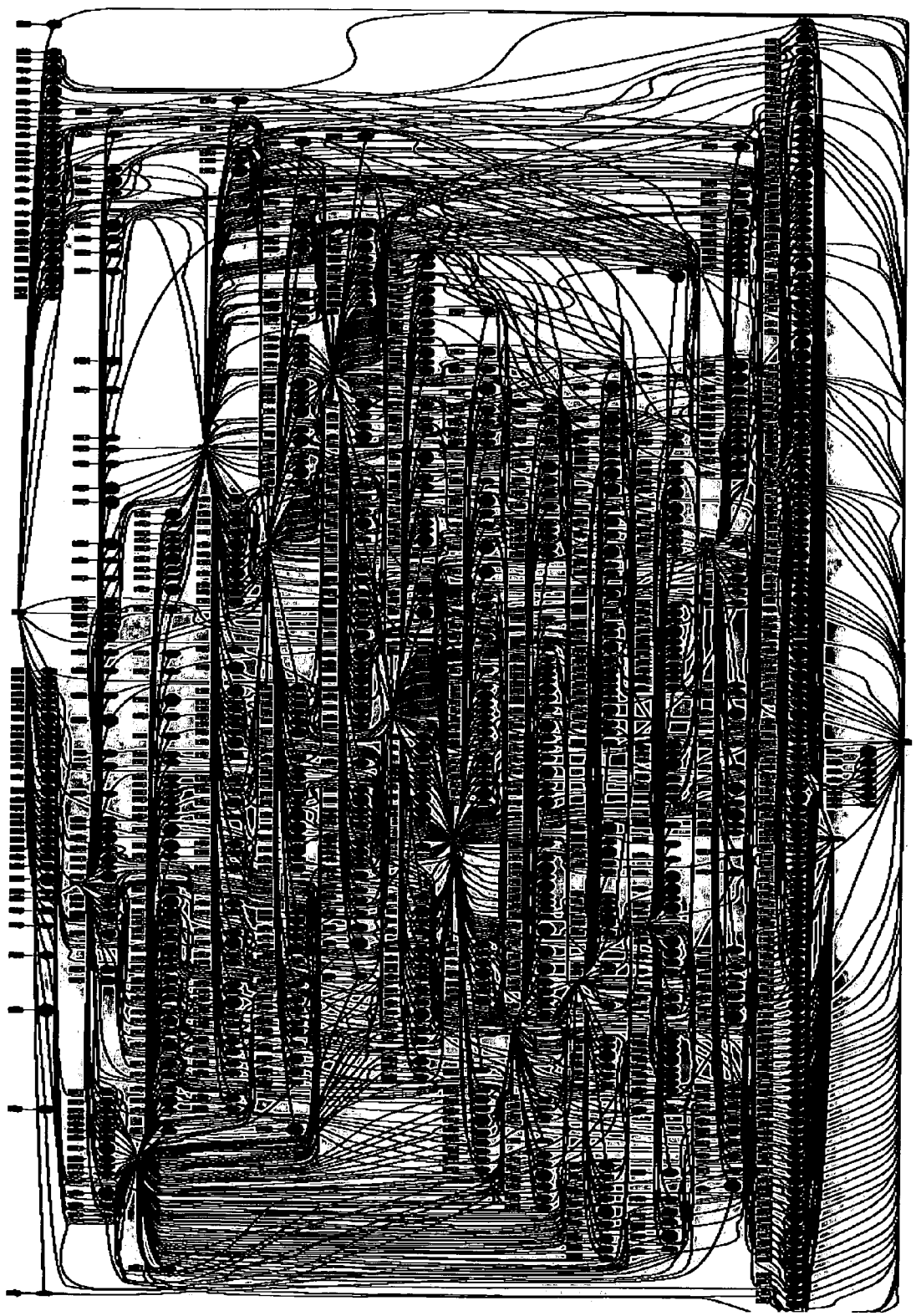
FIG. 1 is an example attack graph for a 14-machine subnet in accordance with an embodiment of an aspect of the present invention.

For realistic networks, the complexity of generated graphs often greatly exceeds the human ability to understand the relationships and take appropriate action. FIG. 1, which shows an example attack graph for a subnet of only 14 machines with less than 10 vulnerabilities per machine, is an example of how complex an attack graph can become.

The current framework manages attack graph usability complexity through interactive visualization and hierarchical graph aggregation. Described is a visualization framework in which attack graph elements are aggregated hierarchically, i.e., non-overlapping nested attack subgraphs are recursively collapsed. This aggregation allows attack graph complexity to be compressed to an arbitrary degree, with higher levels of aggregation corresponding to higher levels of abstraction. The user should be able to interactively aggregate or de-aggregate an attack graph according to the task at hand, in either a top-down or bottom-up fashion.

A hierarchy of rules may be defined, which controls how attack graph elements or subgraphs can be aggregated at each level of the hierarchy. Rules may be based on either common attribute values for attack graph elements or attack subgraph connectedness. Rules may be implemented to support automatic aggregation at each level of the hierarchy.

A protection domain may be defined to reduce attack graph complexity while preserving semantics. The protection domain may represent a fully connected subgraph (clique) among machines and exploits, for example, as might be found for a set of machines with no traffic filtering among them. Other aggregation rules may reduce complexity in a linear fashion, i.e., they generally map sets of largely independent (sparsely connected) objects to a single vertex. But the protection domain rule may reduce complexity in a quadratic fashion, i.e., it maps fully connected sets of objects (machines and exploits among them) to a single vertex. Protection domains may be known from the network configuration, possibly avoiding the expensive detection of attack graph cliques.

Overall, the worst-case computational complexity in the framework should be quadratic. However, in practice the complexity may be reduced because users generally interact with subgraphs of the attack graph at any given time, and at lower levels of aggregation subgraphs of negligible size are being processed.

Attack Graph Representation: Scalability may be an important property for attack graph representations when dealing with realistic networks. Some attack graphs represent transitions of a state machine, where states are network security attributes and state transitions are attacker exploits, resulting in graphs that enumerate transition paths through state space. These state-based graphs may have the property that one can simply follow a path through the graph to generate an attack path (sequence of exploits leading from the initial state to the goal state). These graphs may grow exponentially with the number of state variables.

However, under the assumption of monotonically increasing state variables, it may not be necessary to explicitly enumerate attack states. Rather, it may be sufficient to form a graph of dependencies among exploits and security conditions. Such dependency graphs should grow only quadratically with the number of (machine-dependent) exploits, so that it becomes feasible to apply them for realistic networks. The assumption of monotonicity may be quite reasonable, corresponding to the conservative assumption that once an attacker gains control of a network resource, he need not relinquish it to further advance the attack. In reality, when non-monotonic attack behavior does occur, it may be at a very detailed level (more detailed than is warranted for network penetration analysis) and resolve to monotonic behavior at a suitable level of detail.

Figure 2:
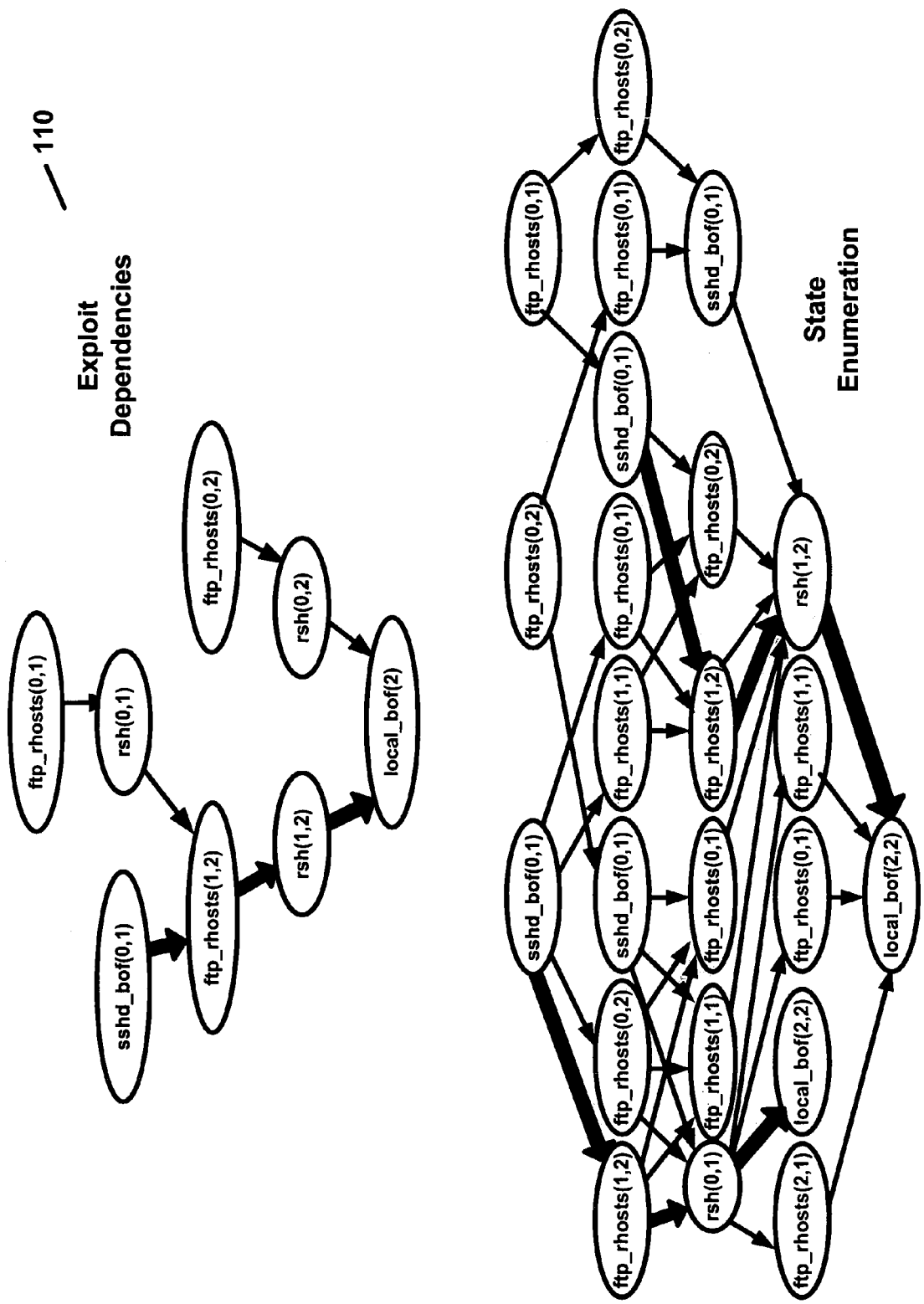
FIG. 2 is an example of an exploit dependency and state enumeration attack graph as per an embodiment of an aspect of the present invention.

FIG. 2 is a comparison of example state-enumeration and exploit-dependency attack graph representations. The example exploit dependency graph and the example state enumeration graph are for an identical network attack scenario. In this example, the exploit dependency graph is clearly more efficient. In the exploit dependency graph, each exploit or dependency appears only once, and no edges appear between independent exploits. For example, in the exploit dependency graph, each of the three exploits ftp_rhosts(0,1), sshd_bof(0,1), and ftp_rhosts(0,2) appears only once, and since these exploits are independent, there are no edges between them. In contrast, in the state transition graph, there are edges (state transitions) between these 3 exploits even though the order of these exploits (transitions) is irrelevant, and these 3 exploits each occur multiple times. Also, the attack path sshd_bof(0,1)→ftp_rhosts(1,2)→rsh(1,2)→local_bof(1,2) appears twice in the state-enumeration graph and only once in the exploit-dependency dependency graph, as marked with bold arrows in the figure.

The compact exploit-dependency graph representation may contain all the information needed for network attack analysis. For example, all paths (through attack state space) may be generated if needed. This compact representation supports efficient forms of post analysis such as the computation of minimal cost network hardening measures. However, it may be important (in addition to computational scalability) that the attack graph be readily interpreted by humans when it is visualized.

Figure 3:
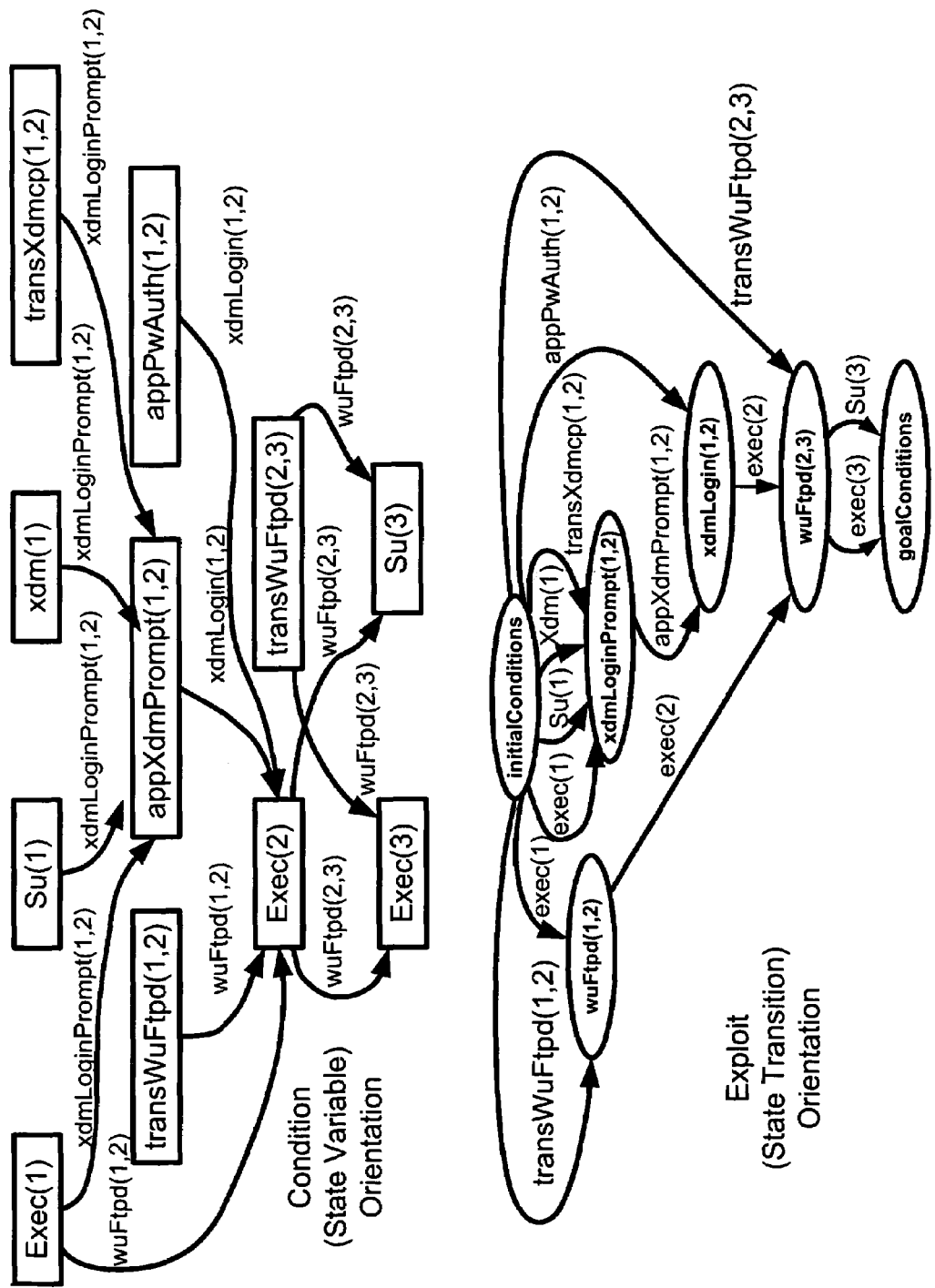
FIG. 3 is an example of condition-orientated and exploit-orientated dependency graphs as per an embodiment of an aspect of the present invention.

In formulation embodiments for monotonic network attack logic, graph dependencies may be oriented in terms of security conditions rather than exploits. That is, graph vertices represent conditions, which are connected by edges that represent exploits. The top of FIG. 3 shows an example of this representation. Here, the attack graph consists of exploits among three machines, with the attack goal of executing commands as superuser on Machine 3. The attack graph is actually very simple in this example, consisting of these two paths: (1) wuFtpd(1,2)→wuFtpd(2,3) and (2)xdmLoginPrompt(1,2)→xdmLogin(1,2)→wuFtpd(2,3). However, the essential flow of these 2 attack paths may not be visually obvious in this representation. The problem is that individual exploits are distributed throughout the graph, rather than being centralized. This can make it difficult to visually follow the distinct steps in the attack. An alternative attack dependency representation that is the dual of the one in the top of FIG. 3, with security conditions being edges and exploits being vertices. That is, exploits are connected to one another via precondition/postcondition dependency edges, making the graph exploit oriented. In the exploit-oriented representation, the sequences of exploits comprising the attack are visually obvious, since each exploit is centralized in the graph.

The bottom of FIG. 3 is the exploit dependency version of the condition dependency graph in the top of FIG. 3. For consistency, the exploit dependency representation includes a distinguished "initial conditions" exploit having null preconditions and postconditions equivalent to the initial conditions in the network model. Similarly, goal conditions may be handled by a distinguished "goal conditions" exploit having null postconditions and preconditions equivalent to the specified attack goal conditions. The exploit-oriented dependency graph may be the basic representation used in our framework. Technically, it is a multigraph, with parallel edges for the preconditions or postconditions of a single exploit.

For interactive visualization, the basic exploit-oriented representation shown in the bottom of FIG. 3 may be modified somewhat. One modification may be to remove the initial condition and goal condition exploit vertices, and replace them with individual condition vertices. This may help keep these conditions visually localized with their corresponding exploits, and helps reduce edge-crossing clutter on larger graphs. Another modification may be to introduce an intermediate common vertex for duplicate preconditions for an exploit. These duplicate preconditions can come from exploits with identical postconditions, forming a logical disjunction (Boolean OR), and one may want to make this visually obvious. In this case, there may be something of a hybrid between the condition-oriented and exploit-oriented representations, since both conditions and exploits appear as attack graph vertices.

Attack Graph Aggregation: It has been previously described how the exploit-dependency representation, in comparison to the state-transition representation, reduces attack graph complexity from exponential to quadratic, which makes attack graph generation computationally feasible for realistic networks. But exploit dependency graphs may still be too complex for humans to easily understand. As a simple example, an attack graph with 100 exploits could have up to $100^2=10,000$ edges in the exploit dependency graph. It is clear that a human might be unable to assimilate such a large graph all at once.

For visualizing large attack graphs, a key strategy for managing complexity is to reduce the apparent size of the information space, consistent with the semantics of the problem. Complexity may be reduced through hierarchical (recursive) graph aggregation, with higher levels of aggregation corresponding to higher levels of abstraction and lower complexity.

While in principle it might be possible to allow attack graph aggregation in a totally arbitrary fashion, it may be better to take advantage of domain knowledge and constrain aggregation according to the semantics of the network attack problem. Thus, a hierarchy of rules may be defined that determine the conditions under which certain attack graph elements can be aggregated. This rule hierarchy may not be overly restrictive, i.e., violations of these rules would yield aggregations of semantically incompatible elements.

Figure 4:
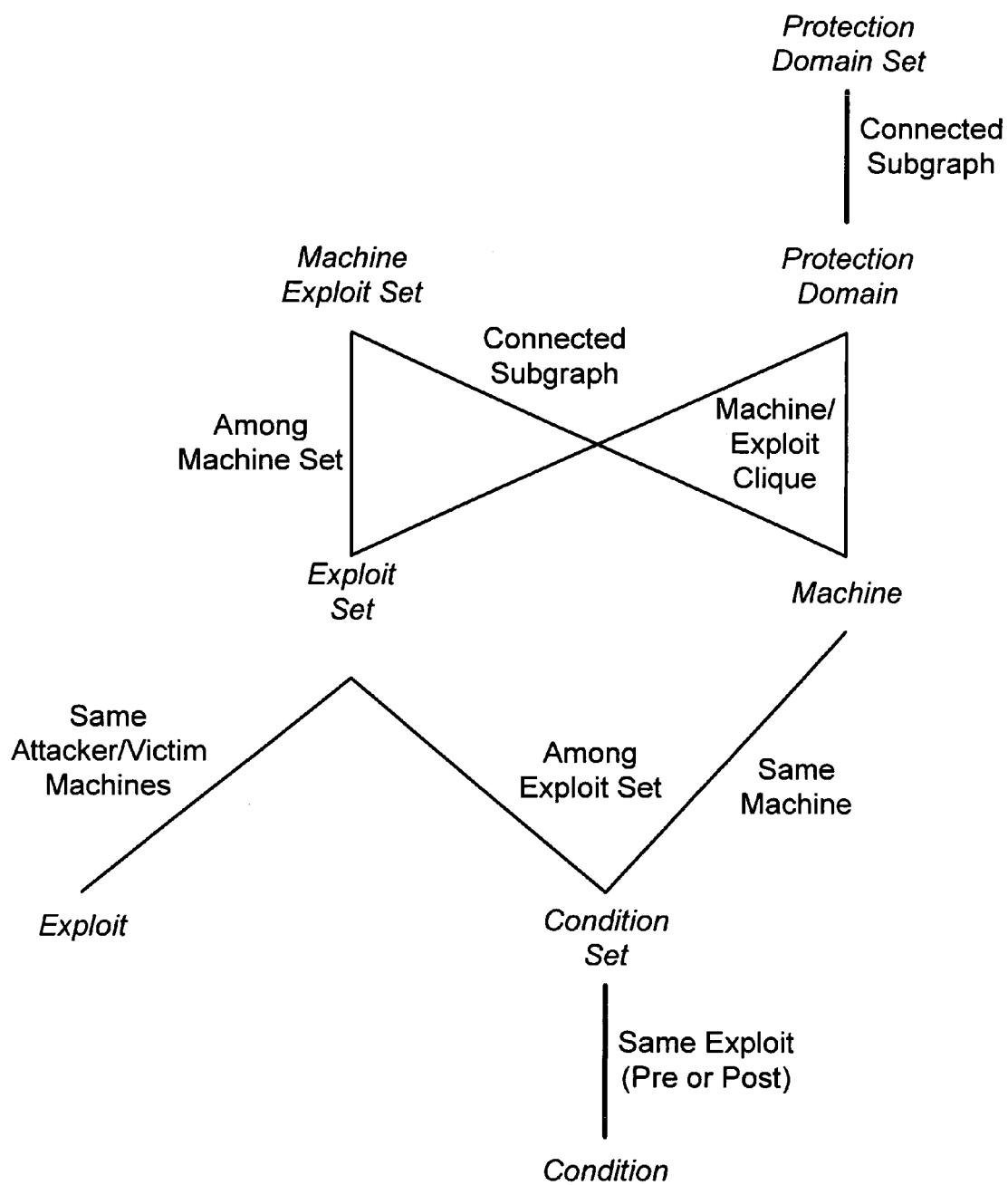
FIG. 4 shows an example of a hierarchy of rules for aggregating an attack graph as per an embodiment of an aspect of the present invention.

FIG. 4 shows an example aggregation hierarchy, with level-dependent rules for aggregating elements of an attack graph. The user should be able to interactively aggregate or de-aggregate an attack graph, either top-down bottom-up.

At the bottom of the hierarchy in FIG. 4, exploits and conditions may be aggregated into exploits sets and condition sets, respectively. Condition sets may be aggregated into either machine abstractions or exploit sets. Sets of machines and the exploits among them may be aggregated into machine-exploit sets or protection domains, and protection domains aggregated into protection domain sets. Here, protection domains can represent fully connected subgraphs (cliques) among machines and exploits, which may be assumed to be known from the network configuration, so that expensive clique detection may be avoided. Aggregation into sets of protection domains may require testing whether the protection domains are connected, which can have linear complexity in the size of the graph of aggregated protection domains. For levels of the aggregation hierarchy other than protection domain sets, the rules may be based on matching attribute values of attack graph elements (which are known from the network configuration), allowing very efficient automatic aggregation.

A rule for exploits may constrain aggregation to those with the same pair of (possibly identical) attacker/victim machines. That is, only exploits between the same pair of machines are aggregated. This may not be overly restrictive, because exploits between different pairs of machines may be aggregated at the machine level. Assuming exploits are sparsely interconnected via conditions (which may be true in practice), exploit aggregation should reduce graph complexity essentially linearly, since the number of condition edges should be roughly proportional to the number of exploits between a pair of machines.

Conditions may be aggregated into sets if they are either preconditions or postconditions (but not both) of the same exploit. This may not be overly restrictive, because in terms of understanding attack paths, there may be no reason to mix conditions across exploits, or to mix preconditions and postconditions of an exploit. Also, conditions across exploits may be subsequently included in higher-level machine aggregations. Since sets of preconditions or postconditions for an exploit may be independent, condition aggregation should reduce attack graph complexity essentially linearly with the number of exploits.

Sets of conditions may be aggregated into a machine abstraction if they are all conditions on that machine. Thus, a machine may simply be the union of all its conditions. One may use the convention that conditions for network connections, which involve both a source (attacker) and destination (victim) machine, belong to the source machine, because we are taking the point of view of the attacker. The rule for aggregating condition sets into machines may not be overly restrictive, since for understanding attack paths there may be no reason to mix conditions across machines, and such conditions may be subsequently included in higher-level machine set aggregations. Assuming sets of conditions for a machine are largely independent, condition set aggregation to machines may reduce attack graph complexity essentially linearly with the number of machines. Condition sets may also be aggregated, along with exploits, to form an exploit set. The rule here may be that the aggregated conditions must be from among the exploits being aggregated.

Machines and the exploits among them may be aggregated to a machine-exploit set if they form a connected subgraph, which allows machines to be aggregated across protection domains. However, the clique property may not be guaranteed for the aggregated set, because it may be based on pre-defined protection domains. Also, machines may not be aggregated into sets automatically, only manually, since the semantics of an arbitrary set of machines independent of protection domain is unclear without prior knowledge. Restricting machine-exploit sets to connected subgraphs may prevent aggregation of machines into sets that have unreachable components within them. This is may not be overly restrictive, because disconnected attack graph components may correspond to attacker unreachability.

The protection domain abstraction may represent a set of machines that have unrestricted access to one another's vulnerabilities, so that the attack graph is fully connected among them (if one treats exploit sets between a pair of machines as graph edges). A protection domain may actually be a clique, perhaps even a maximal clique, and finding maximal cliques is NP-complete. However, operationally, protection domains may be identified from the network configuration. A common type of protection domain may be a set of machines (e.g., a subnet) with no traffic filtering (e.g., firewalls) among them. In this case, protection domains may be obtained from the subnet mask and machine IP addresses. The protection domain abstraction may be particularly effective at reducing attack graph complexity, and may have clear and useful semantics. While the other abstractions involve aggregation of largely independent (sparsely connected) objects, the protection domain may aggregate fully connected sets of objects (machines and exploits among them), reducing complexity quadratically rather than linearly.

At the highest level of abstraction, protection domains may be aggregated into sets. Here, the only restriction may be that the protection domains to be aggregated form a connected subgraph. This restriction may prevent aggregation of protection domains into sets that have unreachable components within them. This may not be overly restrictive, because disconnected attack graph components may correspond to attacker unreachability. Like machine sets, protection domain sets may not be formed automatically, since the semantics of an arbitrary set of protection domains may be unclear without additional prior knowledge.

The aggregation hierarchy may guide the interactive visual exploration of an attack graph. Typically, automatic aggregation at all levels might be applied initially. One might then proceed in a top-down fashion, starting at the highest levels of abstraction and progressively moving towards lower levels of details through de-aggregation. The system may also support bottom-up aggregation (either manual or automatic), perhaps even starting at the lowest possible level, i.e., the fully non-aggregated attack graph. To provide full interactive flexibility, the system may allow the user to aggregate or de-aggregate non-uniformly as desired, i.e., to different levels of details for different portions of the attack graph. Also, arbitrary subsets of elements within a particular level might be aggregated, or elements within a level might be aggregated recursively, as long as the aggregation rule for the level is followed. Another property is persistence, in which the particular structure of an aggregated subgraph persists when it is subsequently de-aggregated.

Figure 5:
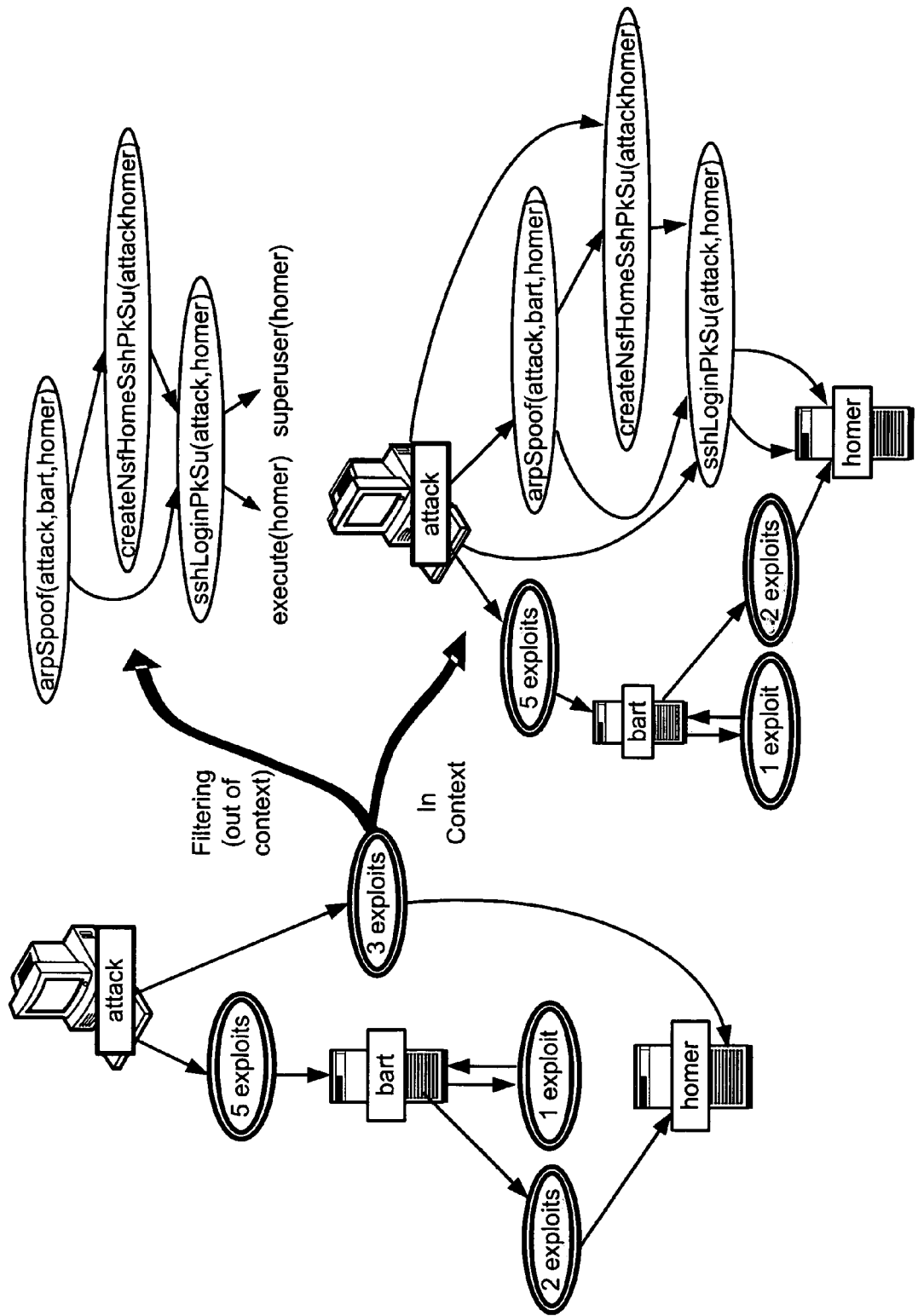
FIG. 5 shows an diagram illustrating two possible modes of interactive de-aggregation.

FIG. 5 shows two possible modes of interactive de-aggregation. One mode may be to de-aggregate by presenting the contents of the de-aggregated vertex completely isolated from the vertex's original context, i.e., to use de-aggregation as a filter. In this case, the vertex may serve as a filter criterion, with the remainder of the attack graph being removed. Another possible mode of de-aggregation is to present the contents of the de-aggregated vertex within the full context of the remainder of the graph. While both modes are possible, even within a single interactive system, one may focus on in-context de-aggregation, although the framework should apply equally to the two modes.

Visualizing Aggregated Graphs: Hierarchical attack graph aggregation, with rules for aggregating objects at each level of the hierarchy have been described earlier. This may allow attack graph abstraction at various levels, from high-level overviews to low-level details. However, the effectiveness of interactive attack graph exploration may depend on the particular visual (as opposed to mathematical) representations used. This section describes the visual representations in the framework. To do this, an example software system implemented for generating and interactively visualizing network attack graphs may be applied.

The system may build a model of network vulnerabilities and connectivity automatically using a vulnerability scanner such as the open-source Nessus vulnerability scanner available from Tenable Network Security, Inc. in Columbia, Md. In the example, about 550 attacker exploits relevant to progressive network penetration have been modeled in terms of preconditions and postconditions on generic attacker/victim machines. Not all these modeled exploits might appear in an attack graph, only those represented by actual vulnerabilities on the scanned machines in the network. Moreover, such exploits may be reachable by the attacker given the network connectivity, a starting machine (and user privilege level), and a network attack goal. From the network attack model, the system may build exploit sequences leading from the initial network conditions to the attack goal. In doing this, it may match generic (machine independent) exploits with specific machines in the network model. The analysis can begin by building an exploit precondition/postcondition dependency graph in the forward direction, adding executable exploits starting from the initial conditions. The system may then traverse the resulting dependency graph in the backward direction, retaining relevant exploits starting from the goal conditions.

Figure 6:
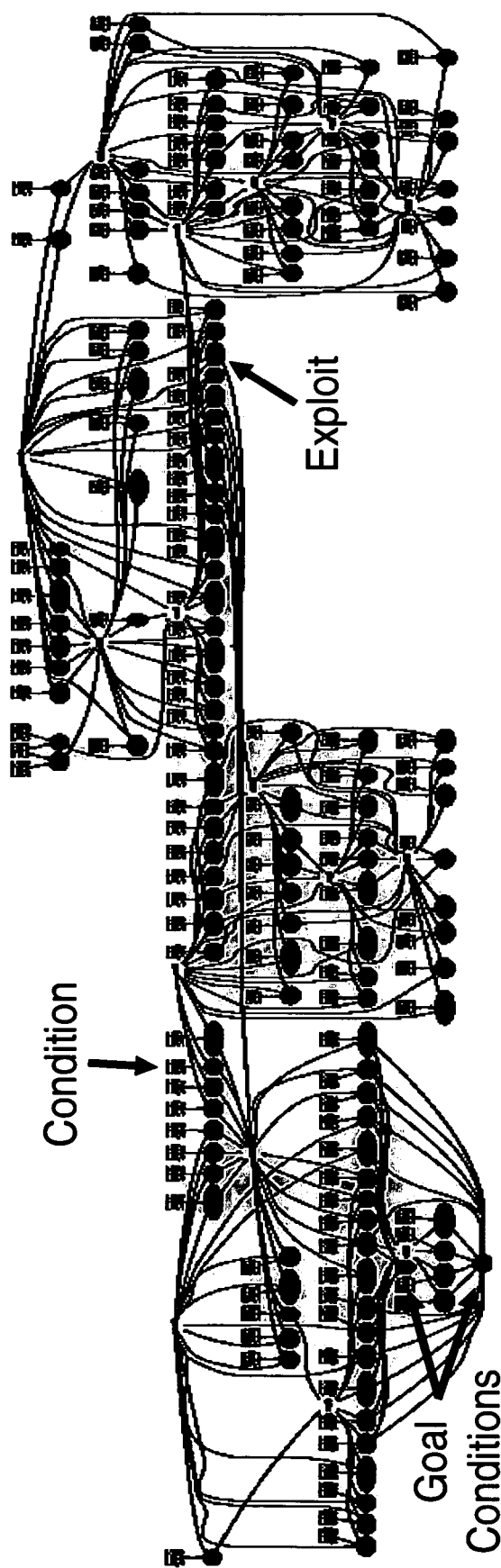
FIG. 6 shows the non-aggregated version of an attack graph for an example network as per an embodiment of an aspect of the present invention.

FIG. 6 shows a non-aggregated version of the attack graph for an example network. In the figure, exploits are represented as ovals, initial conditions are represented as boxes, goal conditions are represented as octagons, and all other conditions are represented as plain text. In this example network, there are 16 victim machines organized into 4 subnets, with firewalls restricting connectivity between subnets. From the attack graph, some clustering of attacker exploits may be seen, which may be caused by the unrestricted connectivity among machines in each subnet and restricted connectivity across subnets. But from the non-aggregated view, it may be difficult to understand the exact nature of this clustering and to understand the overall flow of the attack.

Figure 7:
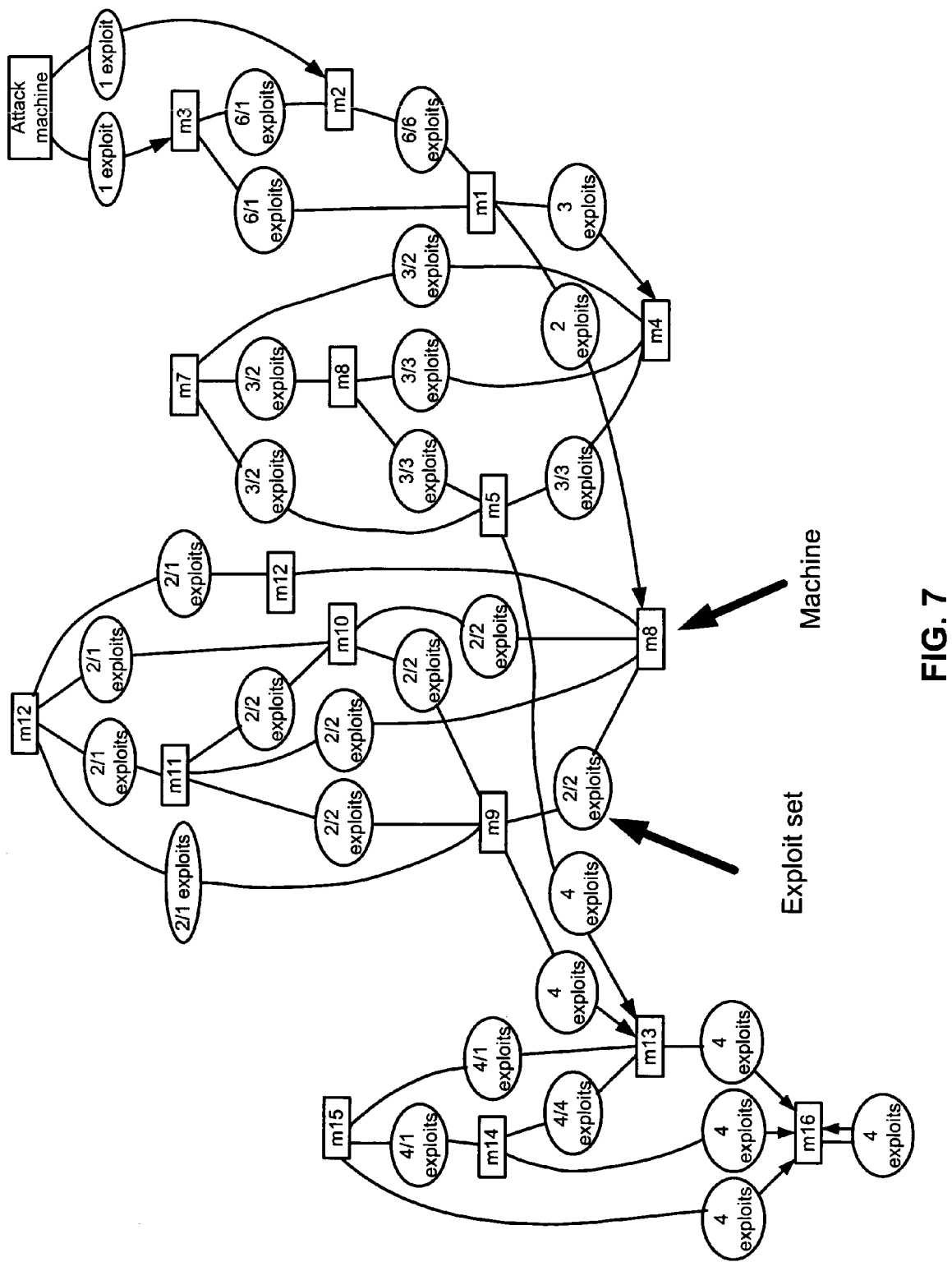
FIG. 7 shows the non-aggregated attack graph in FIG. 6 automatically aggregated to the level of machines and sets of exploits between them as per an embodiment of an aspect of the present invention.

In FIG. 7, the non-aggregated attack graph in FIG. 6 has been aggregated (automatically) to the level of machines and sets of exploits between them. That is, conditions for each machine have been aggregated to a single machine vertex (represented with a rectangle in the figure), and individual exploits between each pair of attacker/victim machines have aggregated to single vertices. In the framework, aggregation can occur at mixed levels of the hierarchy—the single level shown here is for illustrative purposes. In FIG. 7, exploit set glyphs (ovals) may include the number of exploits (in each direction) between each machine pair, and may be shaded in proportion to the number of exploits (actually, the greater number between the 2 directions), so that larger sets of exploits appear darker. Also, exploit set glyphs may have a second periphery to distinguish them from single exploits. Graph edges can have arrowheads if the attack flows in a single direction, and the lack of an arrowhead can mean that exploits can be launched in either direction between a pair of machines. In comparison to the non-aggregated attack graph in FIG. 6, this graph can be much less complex, and the overall attack flow and exploit clustering by subnet are clearer. However, it can be tedious to manually determine that the visual clusters really constitute subnet protection domains (fully-connected subgraphs), and to understand the exact nature of interaction across subnets.

Figure 8:
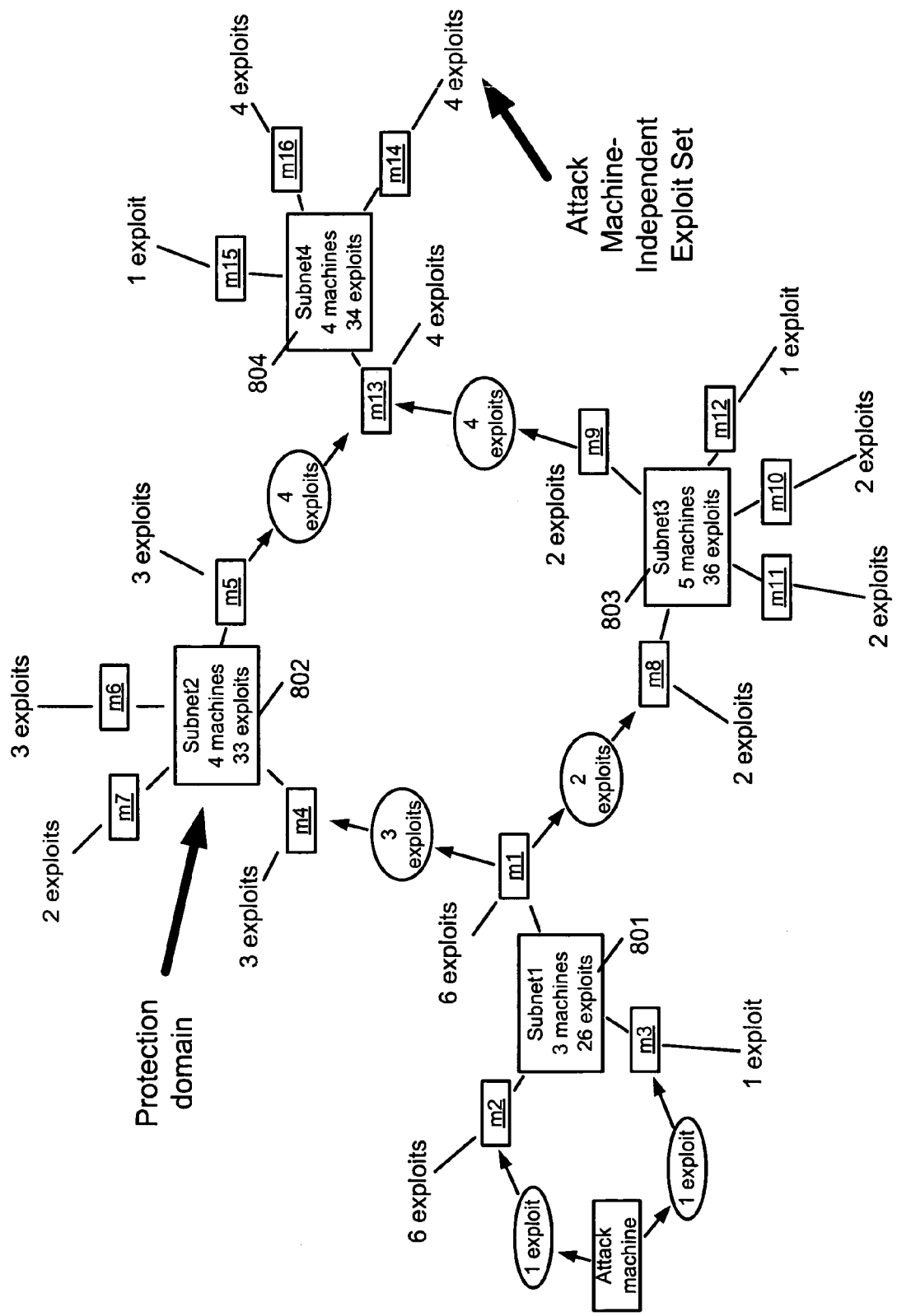
FIG. 8 shows an example attack graph aggregated to protection domains as per an embodiment of an aspect of the present invention.

In FIG. 8, the example attack graph has been aggregated to the level of protection domains. This was done using an aspect of an embodiment automatically from the network model via subnet mask and IP addresses. Protection domains are shown explicitly, and with adjacent machines indicating protection domain membership. The initial attack machine, being in a separate subnet, is shown as a single machine.

In FIG. 8, edges between protection domains (801, 802, 803, and 804) and machines m1 through m16 are without arrowheads, indicating that exploits are launched in both directions among machines in a protection domain. Protection domain glyphs can include the number of machines in the protection domain, as well as counts of exploits launched within the subnet. Exploit sets (in plain text) adjacent to machines may represent exploits that could be launched against a machine from within the protection domain. Actually, in this visual representation, these exploits can be independent of attacker machine, and as such they can represent machine vulnerability rather than aggregation of individual exploits. The actual exploits may instead be aggregated in the protection domain vertex. Exploit sets across protection domains can be adjacent to their respective attacker/victim machines, explicitly showing the interaction across protection domains.

In FIG. 8, the overall attack flow can be quite clear, in which the attack starts by compromising Subnet1 801, branches to Subnet2 801 and Subnet3 803 (with no interaction between Subnet2 and Subnet3), and ends with compromise of Subnet4 804. The protection domains (subnets) may be represented explicitly, and interaction across subnets clear. Moreover, in comparison to FIG. 6 and FIG. 7, attack graph complexity can be greatly reduced.

Figure 9:
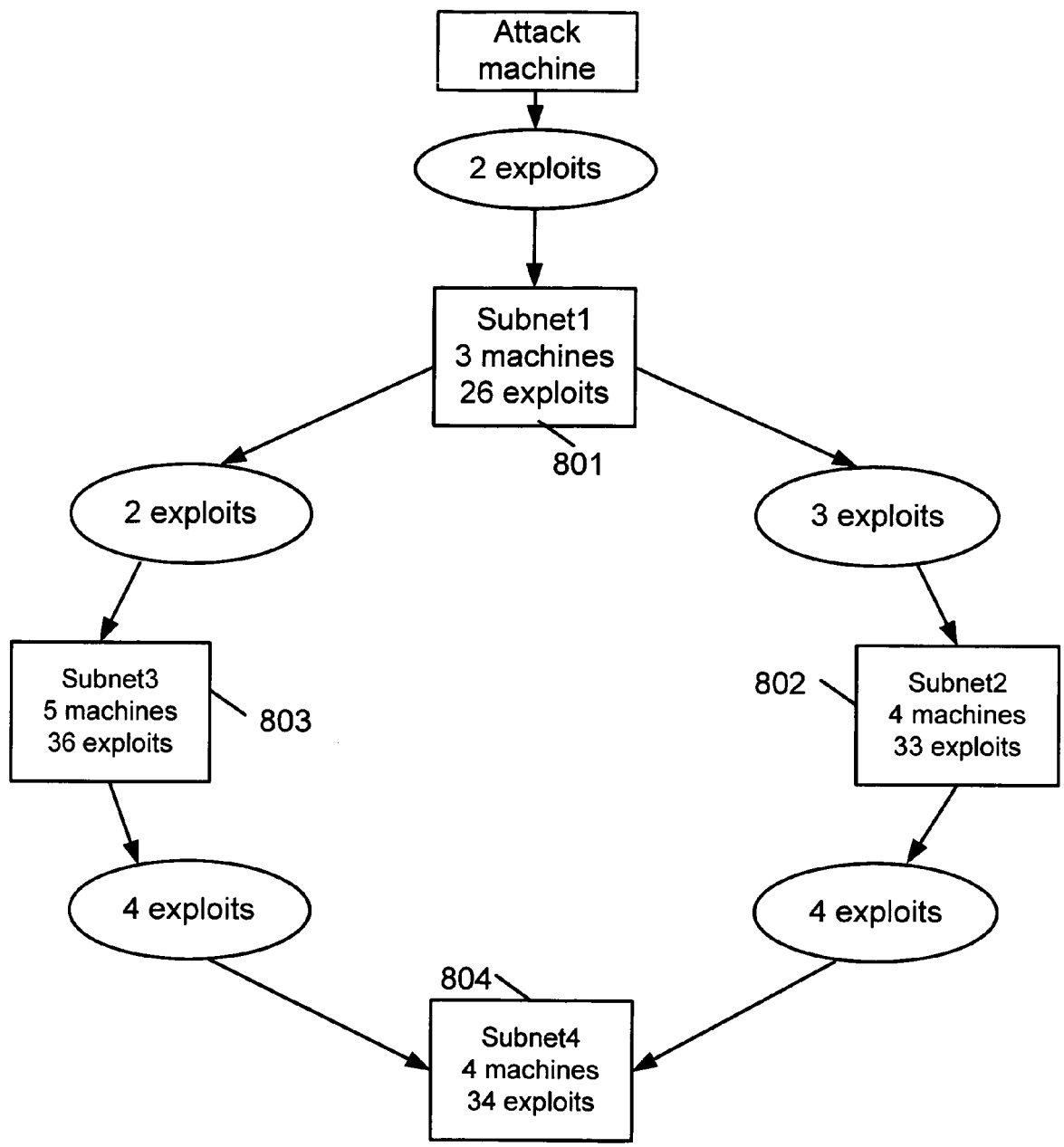
FIG. 9 shows a high-level view of protection-domain aggregation as per an embodiment of an aspect of the present invention.

FIG. 9 shows an example of a higher-level visual representation of the example attack graph aggregated to protection domains. In this representation, individual machines in each subnet and their associated attack-machine-independent exploits are not shown. Here, the subnet structure, interaction across subnets, and overall attack flow can be clear. In practice, this is the kind of high-level view that could initially be presented to the user. The attack graph could initially be aggregated (automatically) at each level of the hierarchy, and interactively de-aggregated and the user explores the attack graph top-down. This interactive de-aggregation can be localized, e.g., only individual objects would be de-aggregated, as opposed to global de-aggregation in which all objects at a given level are de-aggregated.

In previous views for this example attack graph, objects have been aggregated homogeneously to a particular level of the hierarchy. But the framework is not restricted to such single-level views. In fact, views are possible with arbitrarily mixed levels. That is, objects at various levels of aggregation are consistent with one another. Thus in the framework, one can focus attention and retain context in arbitrary ways.

Figure 10:
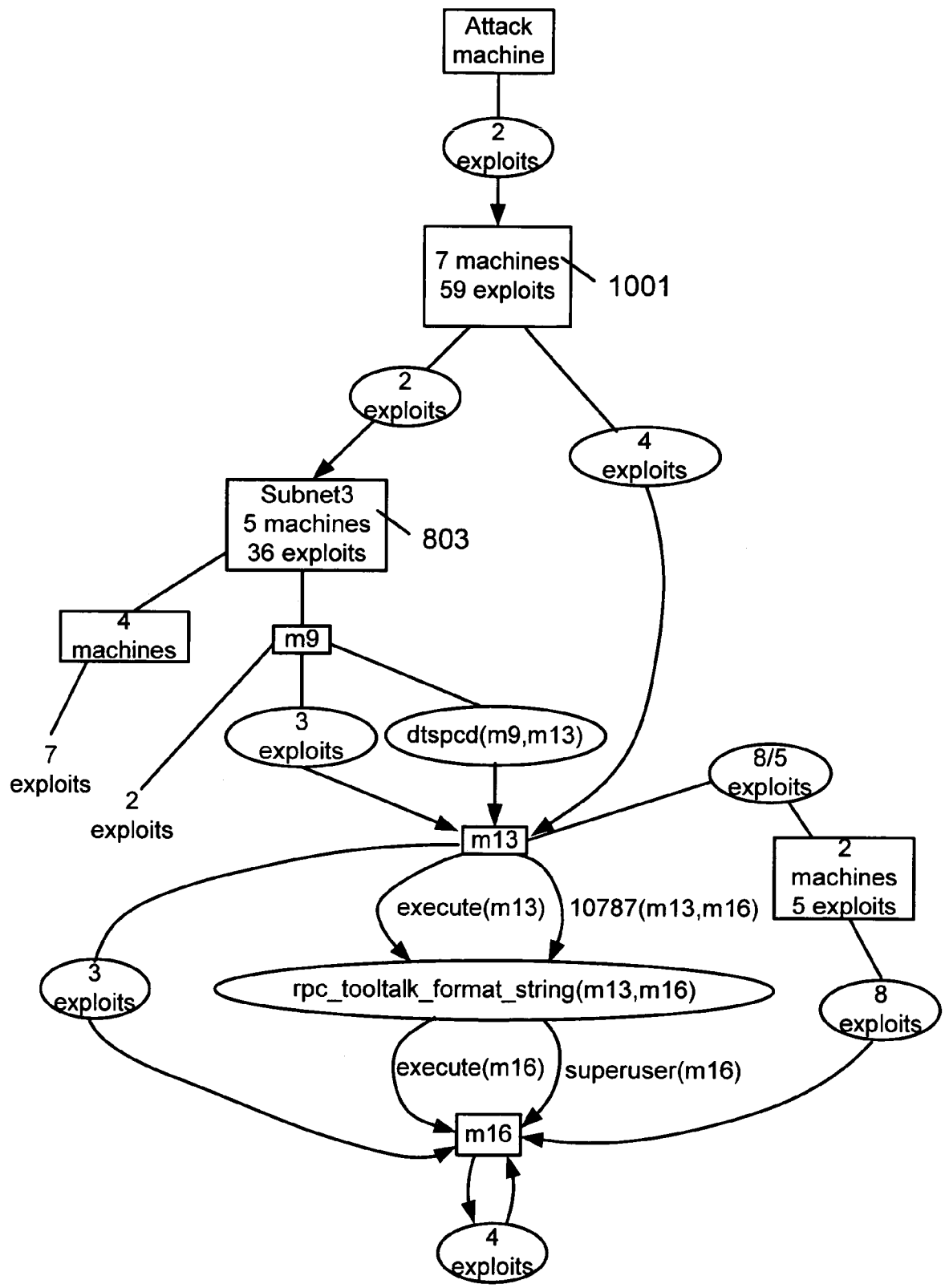
FIG. 10 shows an example attack graph representation with mixed levels of aggregation as per an aspect of an embodiment of the present invention.

FIG. 10 shows an example mixed-level view for the example attack graph. The view can include objects at all levels of the aggregation hierarchy. The level of detail is low near the start of the attack, and increases toward the attack goal. This might be the kind view one would use to focus on details near the goal and keep the early part of the attack graph as a high-level overview.

In FIG. 10, Subnet1 801 and Subnet2 802 are aggregated to a protection domain set 1001, whose glyph contains a count of the combined machines and exploits among them. For Subnet3, 4 of the 5 machines have been aggregated into a machine set, and the remaining machine is un-aggregated. Also, 3 of the 4 exploits from machine m9 to machine m13 (from Subnet3 to Subnet4, respectively) are aggregated. Subnet4 does not appear explicitly, i.e., there is no aggregation up to the level of protection domain for Subnet4. Rather, 2 of the 4 machines in Subnet4 are in a machine set, and the remaining 2 machines appear separately. Between machines m13 and m16, 3 of the 4 exploits are aggregated to a set. For the remaining exploit, all preconditions and postconditions are un-aggregated, as opposed to the exploit between machines m9 to m13, in which the preconditions and postconditions are aggregated to condition sets.

Further Embodiments

Figure 11:
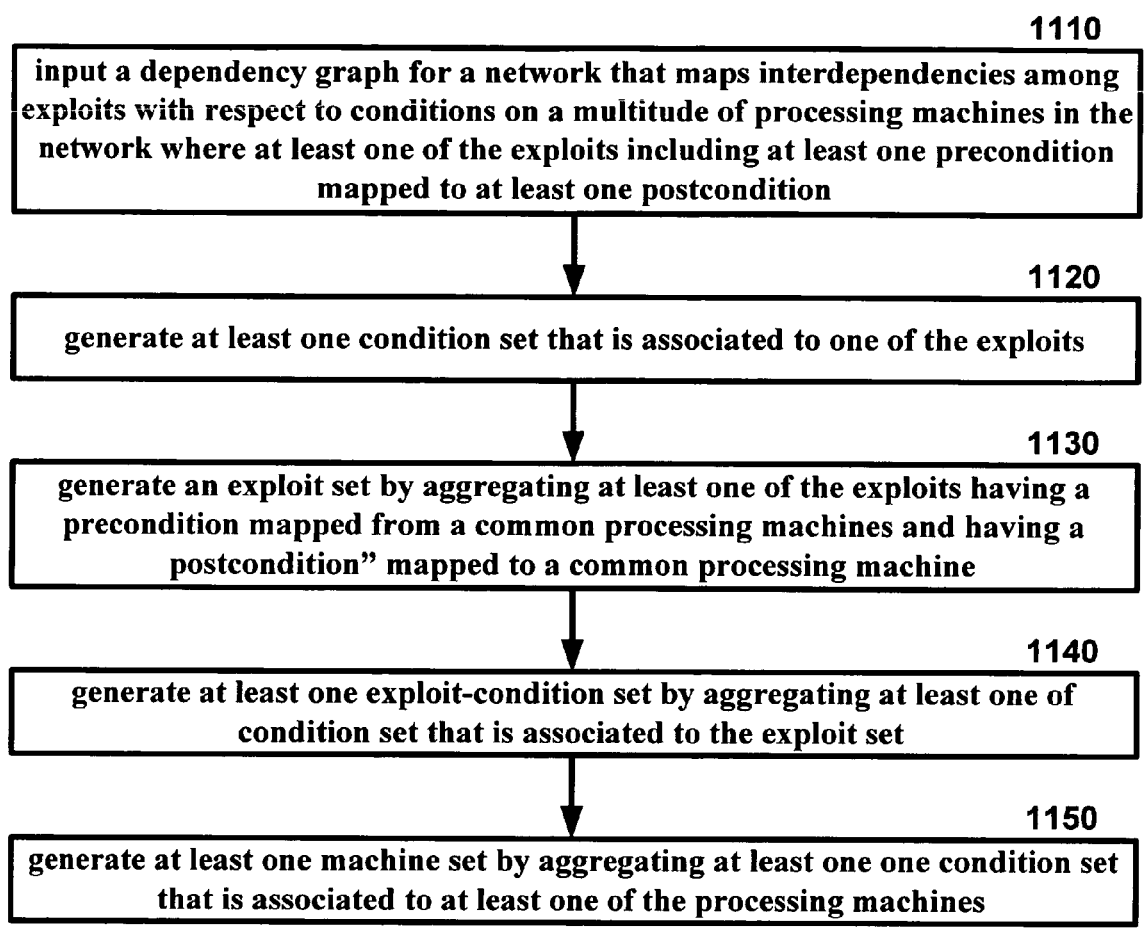
FIG. 11 is a flow diagram of an aspect of an embodiment of the present invention.
Figure 12:
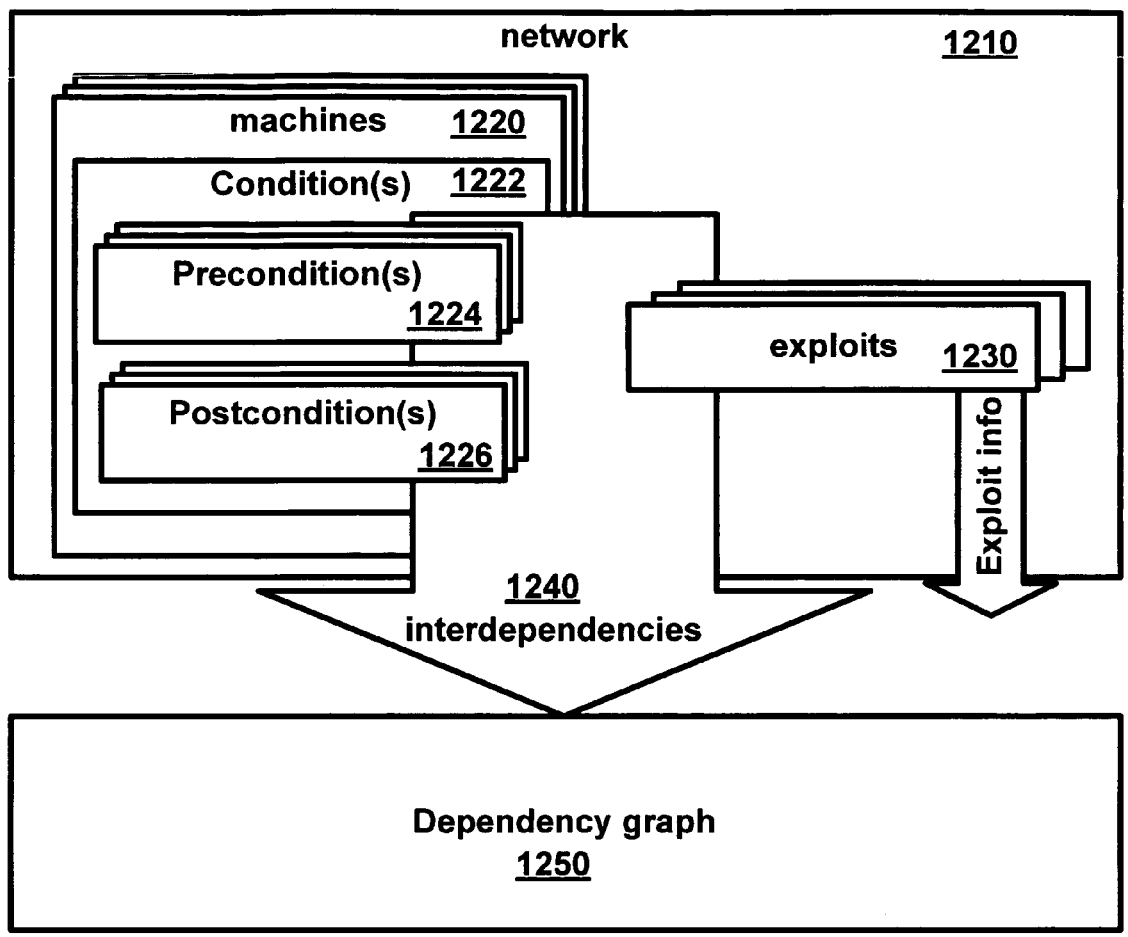
FIG. 12 is a block diagram of a network as per an aspect of an embodiment of the present invention.
Figure 13:
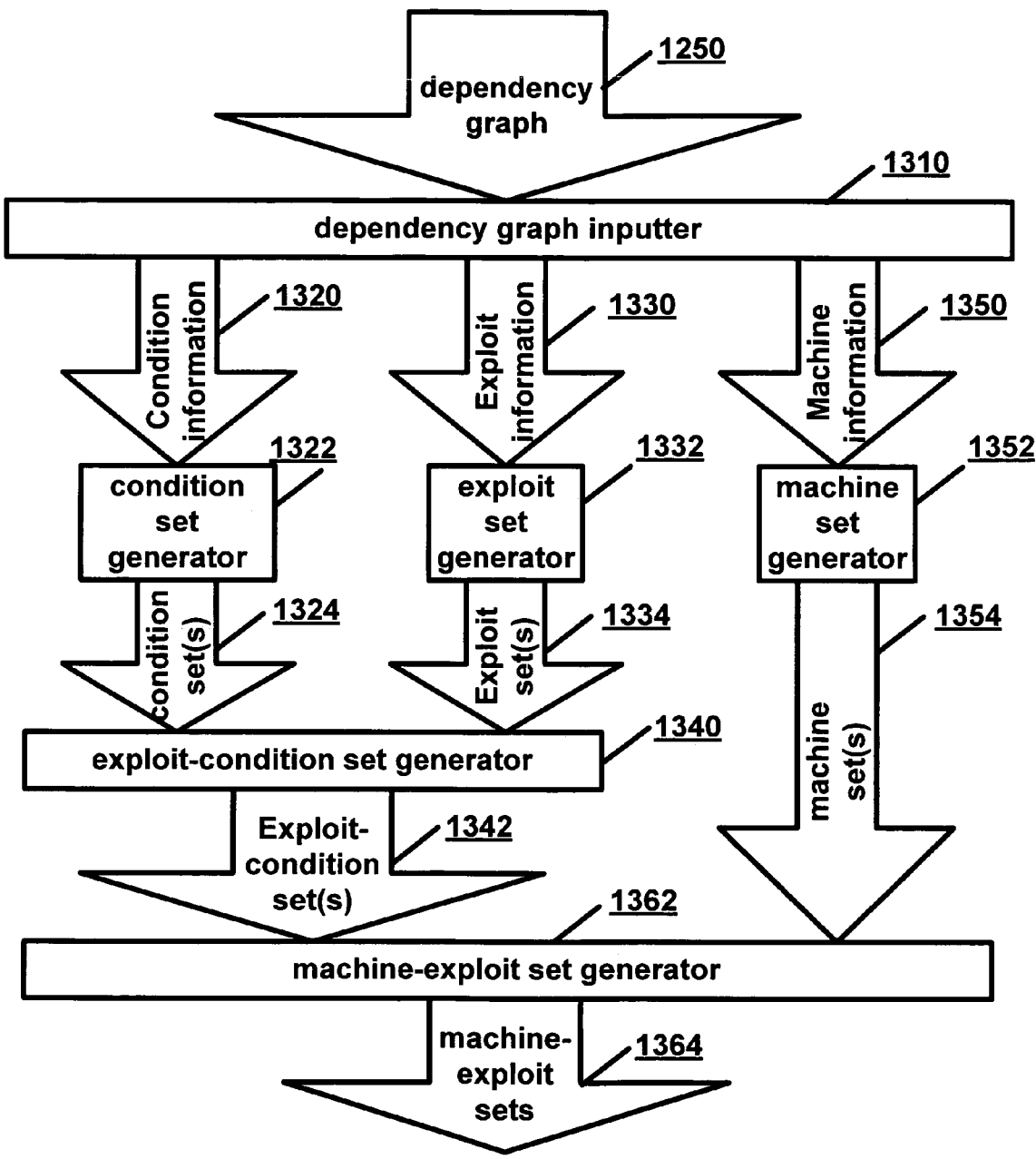
FIG. 13 is a block diagram of an aspect of an embodiment of the present invention.

The disclosed framework may be embodied as a computer program that may be stored on a tangible computer medium. The computer program including a series of instructions that when executed by one or more processors, should cause the one or more processors to perform a series of calculations related to attack graph aggregation. Certain embodiments may allow for the computer program to be manually directed. FIGS. 11, 12, and 13 help illustrate aspects of example computer program embodiments related to attack graph aggregation described above. More specifically, FIG. 11 is a flow diagram, FIG. 12 is a block diagram of an example network, and FIG. 13 is a block diagram.

A dependency graph 1250 for a network 1210 may be inputted for processing at 1110 by a dependency graph inputter module 1310. The dependency graph 1250 should map interdependencies 1240 among a multitude of exploits 1230 with respect to a multitude of conditions 1222 on a multitude of processing machines 1220 in the network 1210. The dependency graph may also be an attack graph. The conditions 1222 can include precondition(s) 1224 and postcondition(s) 1226. Precondition(s) 1224 may include elements of a computer network that contribute to a network attack vulnerability. Similarly, postcondition(s) 1226 may include elements of a computer network that contribute to a network attack vulnerability. At least one of the multitude of exploits 1230 may include at least one precondition 1224 mapped to at least one postcondition 1226. The dependency graph may use a low-order polynomial representation. The dependency graph inputter module 1310 may be all or part of computer software module.

Using condition information 1320, a condition set 1324 may be generated at 1120 by a condition set generator module 1322. Condition set(s) may be associated to one of the multitude of exploits by: aggregating at least two of the condition(s) that have preconditions mapped to the same exploit(s); and aggregating at least two of the condition(s) that have postcondition(s) mapped from the same exploit(s). The condition set generator module 1322 may be all or part of computer software module.

Using exploit information 1330, an exploit set(s) 1334 may be generated by 1130 by an exploit set generator module 1332. This may be done by aggregating exploit(s) 1230 that all have at least one of the precondition(s) 1224 mapped from common one processing machine(s) 1220 and have at least one of the postcondition(s) 1226 mapped to a common processing machine(s) 1220. The exploit set generator module 1332 may be all or part of computer software module.

At 1140, exploit-condition set(s) 1342 may be generated by an exploit-condition set generator module 1340 by aggregating associated condition set(s) 1324 and exploit set(s) 1334. The exploit-condition set generator module 1340 may be all or part of computer software module.

Using machine information 1350, machine set(s) 1354 may be generated by a machine set generator module 1352 by aggregating associated exploit-condition set(s) 1342 and machine set(s) 1354. The machine set generator module 1352 may be all or part of computer software module.

It is envisioned that further embodiments may work with subgraphs. For example, one further embodiment may further include: generating machine-exploit set(s) 1364 by aggregating machine set(s) 1354 that form a connected subgraph, and aggregating exploit-condition set(s) 1342 associated with the connected subgraph; while another further embodiment may further include de-aggregating machine set(s) 1354 that forms a connected subgraph, and de-aggregating exploit-condition set(s) 1342 associated with the connected subgraph.

It is further envisioned that further embodiments may work with protection domains. For example, a further embodiment could include generating protection domain(s) by: aggregating machine set(s) 1354 that form a machine-exploit clique; and aggregating exploit-condition set(s) 1342 associated with the machine-exploit clique. Similarly, another embodiment could include: de-aggregating machine set(s) 1354 that forms a machine-exploit clique; and de-aggregating exploit-condition set(s) associated with the machine-exploit clique.

Protection domain set may be generated by aggregating protection domains that forms a connected subgraph. In a related move, protection domain set(s) may also be de-aggregated by deaggregating protection domain(s) that forms a connected subgraph.

The foregoing descriptions of embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications in form and detail as are suited to the particular use contemplated without departing from the spirit and scope of the present invention. In fact, after reading the above description, it will be apparent to one skilled in the relevant art(s) how to implement the invention in alternative embodiments. Thus, the present invention should not be limited by any of the above described example embodiments. In particular, it should be noted that, for example purposes, the above explanation utilizes modules. One skilled in the art will recognize that above described modules may be implemented in many ways including as software modules written in many different computer languages such as assembly language, JAVA, or C. Similarly, the modules could be implemented as hardware using ASICs, PALs or other equivalent devices.

In addition, it should be understood that any figures, graphs, tables, examples, etc. which highlight the functionality and advantages of the present invention, are presented for example purposes only. The architecture of the present invention is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

Furthermore, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A tangible computer readable storage medium storing a computer program that when executed by one or more processors, causes the one or more processors to perform the steps of:
   a) inputting a dependency graph for a network that maps interdependencies among a multitude of exploits with respect to a multitude of conditions on a multitude of processing machines in said "network," at least one of said "multitude of exploits" including at least one precondition mapped to at least one postcondition, said "multitude of conditions" including at least one of said "at least one precondition" and at least one of said "at least one postcondition";
   b) generating at least one condition set, each of said "at least one condition set" associated to one of said "multitude of exploits" by:
   c) aggregating at least two of said "multitude of conditions" that have preconditions mapped to the same at least one of said "multitude of exploits"; and
   d) aggregating at least two of said "multitude of conditions" that have postconditions mapped from the same at least one of said "multitude of exploits";
   e) generating an exploit set by aggregating at least one of said "multitude of exploits" that all have at least one of said "at least one precondition" mapped from a common one of said "multitude of processing machines" and have at least one of said "at least one postcondition" mapped to a common one of said "multitude of processing machines";
   f) generating at least one exploit-condition set, each of said "at least one exploit-condition set" generated by aggregating at least one of said "at least one condition set" that is associated to said "exploit set"; and
   g) generating at least one machine set, each of said "at least one machine set" generated by aggregating at least one of said "at least one condition set" that is associated to at least one of said "multitude of processing machines".

2. A computer readable medium according to claim 1, further including the step of generating at least one machine-exploit set, each of said "at least one machine-exploit set" generated by:
   a) aggregating at least one of said "at least one machine set" that forms a connected subgraph;
   b) aggregating at least one of said "at least one exploit-condition set" associated with said "connected subgraph."

3. A computer readable medium according to claim 2, further including the step of for at least one machine-exploit set:
   a) de-aggregating at least one of said "at least one machine set" that forms a connected subgraph;
   b) de-aggregating at least one of said "at least one exploit-condition set" associated with said "connected subgraph."

4. A computer readable medium according to claim 2, further including the steps of generating at least one protection domain, each of said "at least one protection domain" generated by:
   a) aggregating at least one of said "at least one machine set" that forms a machine-exploit clique; and
   b) aggregating at least one of said "at least one exploit-condition set" associated with said "machine-exploit clique".

5. A computer readable medium according to claim 4, further including the steps of for at least one of said "at least one protection domain":
   a) de-aggregating at least one of said "at least one machine set" that forms a machine-exploit clique; and
   b) de-aggregating at least one of said "at least one exploit-condition set" associated with said "machine-exploit clique".

6. A computer readable medium according to claim 4, further including the step of generating at least one protection domain set, each of said "at least one protection domain set" generated by aggregating at least one of said "at least one protection domain" that forms a connected subgraph.

7. A computer readable medium according to claim 6, further including the step of for at least one of said "at least one protection domain set", de-aggregating at least one of said "at least one protection domain" that forms a connected subgraph.

8. A computer readable medium according to claim 1, wherein said "dependency graph" uses a low-order polynomial representation.

9. A computer readable medium according to claim 1, wherein at least one of said "at least one precondition" includes elements of a computer network that contributes to a network attack vulnerability.

10. A computer readable medium according to claim 1, wherein at least one of said "at least one postcondition" includes elements of a computer network that contributes to a network attack vulnerability.

11. A computer readable medium according to claim 1, wherein at least one of said "multitude of processing machines" is a computer process.

12. A computer readable medium according to claim 1, wherein said "dependency graph" is an attack graph.

13. A computer readable medium according to claim 1, wherein said "computer program" is manually directed.

14. A computer readable storage medium storing a computer program comprising:
   a) a dependency graph inputter configured to input a dependency graph for a network that maps interdependencies among a multitude of exploits with respect to a multitude of conditions on a multitude of processing machines in said "network," at least one of said "multitude of exploits" including at least one precondition mapped to at least one postcondition, said "multitude of conditions" including at least one of said "at least one precondition" and at least one of said "at least one postcondition";
   b) a condition set generator configured to generate at least one condition set, each of said "at least one condition set" associated to one of said "multitude of exploits" by:
      i) aggregating at least two of said "multitude of conditions" that have preconditions mapped to the same at least one of said "multitude of exploits"; and
      ii) aggregating at least two of said "multitude of conditions" that have postconditions mapped from the same at least one of said "multitude of exploits";
   c) an exploit set generator configured to generate an exploit set by aggregating at least one of said "multitude of exploits" that all have at least one of said "at least one precondition" mapped from a common one of said "multitude of processing machines" and have at least one of said "at least one postcondition" mapped to a common one of said "multitude of processing machines";
   d) an exploit-condition set generator configured to generate at least one exploit-condition set, each of said "at least one exploit-condition set" generated by aggregating at least one of said "at least one condition set" that is associated to said "exploit set"; and
   e) a machine set generator configured to generate at least one machine set, each of said "at least one machine set" generated by aggregating at least one of said "at least one condition set" that is associated to at least one of said "multitude of processing machines".

15. A computer readable medium according to claim 14, further including a machine-exploit set generator configured to generate at least one machine-exploit set, each of said "at least one machine-exploit set" generated by:
   a) aggregating at least one of said "at least one machine set" that forms a connected subgraph;
   b) aggregating at least one of said "at least one exploit-condition set" associated with said "connected subgraph."

16. A computer readable medium according to claim 15, further including a machine-exploit set de-aggregator configured to for at least one machine-exploit set:
   a) de-aggregate at least one of said "at least one machine set" that forms a connected subgraph;
   b) de-aggregate at least one of said "at least one exploit-condition set" associated with said "connected subgraph."

17. A computer readable medium according to claim 15, further including a protection domain generator configured to generate at least one protection domain, each of said "at least one protection domain" generated by:
   a) aggregating at least one of said "at least one machine set" that forms a machine-exploit clique; and
   b) aggregating at least one of said "at least one exploit-condition set" associated with said "machine-exploit clique".

18. A computer readable medium according to claim 17, further including a protection domain de-aggregator configured to for at least one of said "at least one protection domain":
   a) de-aggregate at least one of said "at least one machine set" that forms a machine-exploit clique; and
   b) de-aggregate at least one of said "at least one exploit-condition set" associated with said "machine-exploit clique".

19. A computer readable medium according to claim 17, further including a protection domain set generator configured to generate at least one protection domain set, each of said "at least one protection domain set" generated by aggregating at least one of said "at least one protection domain" that forms a connected subgraph.

20. A computer readable medium according to claim 19, further including a protection domain set de-aggregator configured to, for at least one of said "at least one protection domain set", de-aggregate at least one of said "at least one protection domain" that forms a connected subgraph.

\* \* \* \* \*